United States Patent
Papp et al.

(10) Patent No.: US 11,593,953 B2
(45) Date of Patent: Feb. 28, 2023

(54) IMAGE PROCESSING USING REGISTRATION BY LOCALIZED CROSS CORRELATION (LXCOR)

(71) Applicant: INTELLIGENT IMAGING INNOVATIONS, INC., Denver, CO (US)

(72) Inventors: Nicola Papp, Denver, CO (US); Karl Kilborn, Denver, CO (US)

(73) Assignee: INTELLIGENT IMAGING INNOVATIONS, INC., Denver, CO (US)

( * ) Notice: Subject to any disclaimer, the term of this patent is extended or adjusted under 35 U.S.C. 154(b) by 343 days.

(21) Appl. No.: 16/671,900

(22) Filed: Nov. 1, 2019

(65) Prior Publication Data
US 2020/0143548 A1 May 7, 2020

Related U.S. Application Data

(60) Provisional application No. 62/754,118, filed on Nov. 1, 2018.

(51) Int. Cl.
G06T 7/32 (2017.01)
G06F 17/16 (2006.01)
G06F 17/15 (2006.01)

(52) U.S. Cl.
CPC .......... G06T 7/32 (2017.01); G06F 17/15 (2013.01); G06F 17/16 (2013.01)

(58) Field of Classification Search
CPC ............ G06T 7/32; G06F 17/15; G06F 17/16
See application file for complete search history.

(56) References Cited

U.S. PATENT DOCUMENTS

| 6,343,143 | B1 | 1/2002 | Guillemaud et al. |
| 10,777,010 | B1 * | 9/2020 | Patel ................. G06T 15/50 |
| 2008/0298719 | A1 | 12/2008 | Sengupta et al. |
| 2011/0176731 | A1 * | 7/2011 | Fukushi .............. G06T 7/32 |
| | | | 382/170 |
| 2016/0188559 | A1 | 6/2016 | Maltz |
| 2018/0268237 | A1 | 9/2018 | Stanimirovic et al. |

FOREIGN PATENT DOCUMENTS

WO    WO 2013/126762    8/2013

OTHER PUBLICATIONS

International Search Report for International Application No. PCT/US2019/059420, dated Jan. 21, 2020.
Written Opinion for International Application No. PCT/US2019/059420, dated Jan. 21, 2020.
International Preliminary Report on Patentability for International Application No. PCT/US2019/059420, dated May 14, 2021.

(Continued)

*Primary Examiner* — David F Dunphy
(74) *Attorney, Agent, or Firm* — Jason H. Vick; Sheridan Ross, PC

(57) ABSTRACT

Aligning multiple 3D images of an object can be difficult when the representative datasets (images) are large. An exemplary aspect of this technology teaches a technique to subdivide the images and use the alignments between the subdivided images to determine the alignment between the complete datasets.

17 Claims, 3 Drawing Sheets

(56) References Cited

OTHER PUBLICATIONS

Wikipedia "Phase Correlation" Available at https://en.wikipedia.org/wiki/Phase_correlation; printed Oct. 30, 2019.
Goshtasby, A. Ardeshir "2-D and 3-D Image Registration for Medical, Remote Sensing, and Industrial Applications" Wiley-Interscience A John Wiley & Sons, Inc. Publication; 2005.
Schott, John R. "Remote Sensing the Image Chain Approach, 2nd Edition" Oxford University Press, Inc. 2007.
European Search Report for European Application No. 19880758.8, dated Jul. 13, 2022.

* cited by examiner

IMAGE PROCESSING USING REGISTRATION BY LOCALIZED CROSS CORRELATION (LXCOR)

RELATED APPLICATION DATA

This application claims the benefit of and priority under 35 U.S.C. § 119(e) to U.S. Patent Application No. 62/754,118, filed Nov. 1, 2018, entitled "REGISTRATION BY LOCALIZED CROSS CORRELATION (LXCOR)," which is incorporated herein by reference in its entirety

BACKGROUND

Current technology allows acquisition of large 3-dimensional images. These datasets can be very large containing many terabytes of data. For certain techniques, multiple datasets of the same object are obtained and then a method to align the datasets is needed.

For example, multi-view single plane illumination microscopy (MSPIM) acquires images from an object from two orthogonal views. The views are then combined to form a final image with better resolution and isotropic voxels. Before the combination algorithm is applied, the two images must be aligned to each other to better precision than the resolution of the final image. There are two current methods to align the images in use. The first uses a cross-correlation (XCOR) algorithm on the complete datasets. This algorithm works well, but suffers from long computation times which become prohibitive if the datasets are large. The second uses manually selected points of interest in the two images for the alignment.

Other techniques and additional background can be found with reference to: Multi-Focal Structured Illumination Microscopy Systems And Methods, WO2013126762A1, Sub-Resolution Alignment Of Images, US20080298719A1, and Process For The Registration Of Two Different Images Of The Same Object, U.S. Pat. No. 6,343,143B1, all of which are incorporated herein by reference in their entirety.

SUMMARY

One exemplary non-limiting aspect overcomes the limitations of current methods for aligning large datasets by having a fully automated algorithm that can complete in a much faster computation time, with higher accuracy, and more efficiently than a full XCOR algorithm.

As one example, the general concepts of this approach include:

The technique attempts to align two volumes produced by 2 separate recordings of an object.

The technique then tries to determine a 3×4 transformation matrix which, when applied to the second volume, will align it with the first volume.

The process subdivides the volume into a number of smaller volumes. Each subvolume of the first volume is cross-correlated with the corresponding subvolume of the second volume. The location of the cross-correlation maxima gives the shift which would give the best alignment of the two subvolumes. The system then creates a pair of corresponding points: for the first point the technique uses the center of the first subvolume and for the second point the technique uses the same center point plus the correlation shift. This operation produces a number of pairs of corresponding points equal to the number of subvolumes. The system then uses a least square fit algorithm to find the best transformation matrix which matches a set of points to the other.

The system then applies the transformation matrix to the second volume and repeats the process. This procedure is repeated a number of times, each time improving the transformation matrix.

The exemplary steps for setting the initial Registration Transformation matrix to the identity matrix:
Perform a user specified number of Iterations:
1. Apply deskew to the first volume if stage data. Apply deskew (if stage data) and rotation (if stage or slice data), plus current Registration Transform to the second volume. This is performed with a single 3×4 matrix application. If downsampling is optionally selected, interpolate the data on an output grid which is small enough to be Fourier transformed in the GPU. Note: In MSPIM (Multidirectional Selective Plane Illumination Microscopy or mSPIM), Stage Data is obtained by moving the stage, while Slice data is obtained by moving the objective. Stage data—can be renamed to "sample scanned data", or if an explanation is required "Stage data is where the sample is moved through the illumination plane". Stated another way, slice data can be sheet scanned data or data where the illumination plane is scanned through the sample. Additionally, the frequency domain Phase correlation method discussed herein can be implemented, as one example, by the two sample volumes being shifted until their cross-correlation has a high frequency maximum.
2. Remove the background value. Subtract the background value from each volume sample. Removing the background is essential to obtain correct values from the cross-correlation.
3. If downsampling is selected, apply anti-aliasing filter in the frequency domain, using Difference of Gaussian Filter with an appropriate sigma. Then downsample in the space domain.
4. Perform subvolume cross correlations to determine the pairs of corresponding points. The user specifies the size of a cubic subvolume and an overlap. Determine how many subvolumes there are in the X,Y,Z directions, then loop along each axis. Cross-correlate the subvolumes and find the maxima. Limit the search for maxima to a maximum shift distance specified by the user. Collect the pair of points for each subvolume and their cross-correlation quality by using any known frequency domain Phase correlation method. (See as some examples https://en.wikipedia.org/wiki/Phase_correlation)
5. Determine Registration Transform. Sort the point pairs based on the correlation quality, and use only the pairs whose quality is above a percentage of the highest quality. Then use a standard least square fit algorithm to fit a 3×4 transformation matrix which can be restricted, based on user selection, to:
   a. Translation
   b. Translation and Rotation
   c. Translation, Rotation, Scaling
   d. Affine
6. Replace the current Registration Transform Matrix with the product of the matrix derived in step 5 above with the current Registration Transform Matrix.
7. Perform another iteration from step 1.

Some of the parameters in this algorithm are the background values and the subvolume size. If the subvolume is too big, there will not be enough equations, and the shifts will not be very sensitive. If the subvolume is too small, not enough data will enter the correlation. During experimentation with microscopy data, it was determined that that a 30 um cube works well. However, this value could be very different based on the type and size of the data.

Some potential challenges and corresponding solutions. In the instance where there is too much initial misalignment, this may require a larger subvolume, which may not be desirable. In this instance, one could modify the program to allow for an initial iteration with a larger subvolume, before proceeding to iterate over small subvolumes. Another optional solution is to allow for the user to specify an initial shift (visually derived) to remedy this possible problem. As another option, the system can include an option to first correlate the entire volumes to find an initial gross shift.

DETAILED DESCRIPTION

Figure 1:
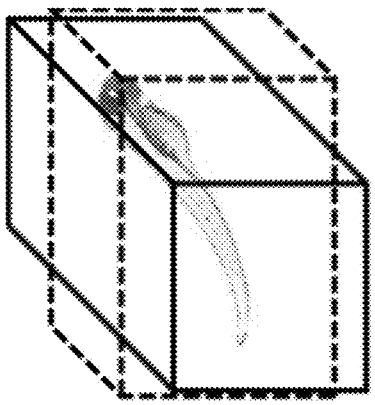
FIG. 1 is a graphical representation of the algorithm for aligning two different views of an object.
Figure 1:
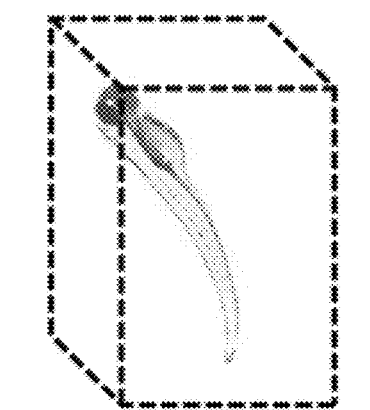
Figure 1:
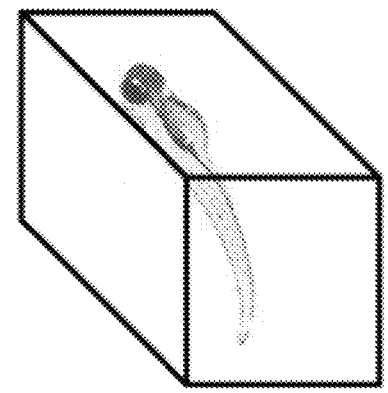
Figure 1:
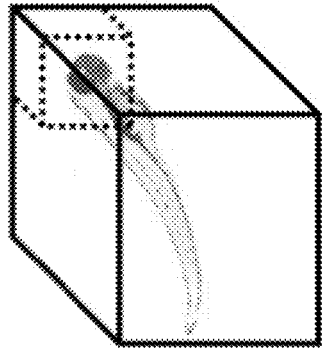
Figure 1:
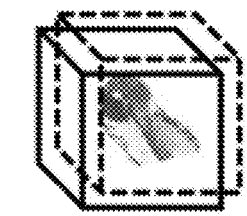
Figure 1:
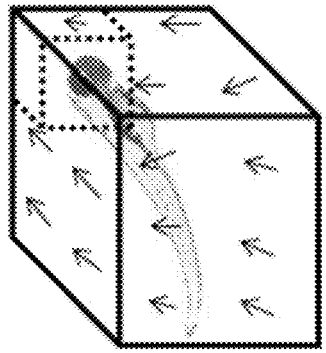

FIG. 1 illustrates graphically the exemplary major steps of how the technique would work for aligning multiple views of an object. The process begins with two different datasets (11, 12) of an object. Two different datasets 11 and 12 that are 3D images of an object are roughly aligned to within the precision of the imaging device to form a base intersection of the data 13. The intersected datasets are subdivided into smaller datasets 14. Each sub-dataset is aligned using a cross-correlation (XCOR) to determine the offsets for the sub-dataset 15. After all of the sub-datasets are aligned, a matrix of offsets is created over the space of the datasets 16. This matrix of offsets is used to calculate the offset required to align the two datasets globally.

Figure 2:
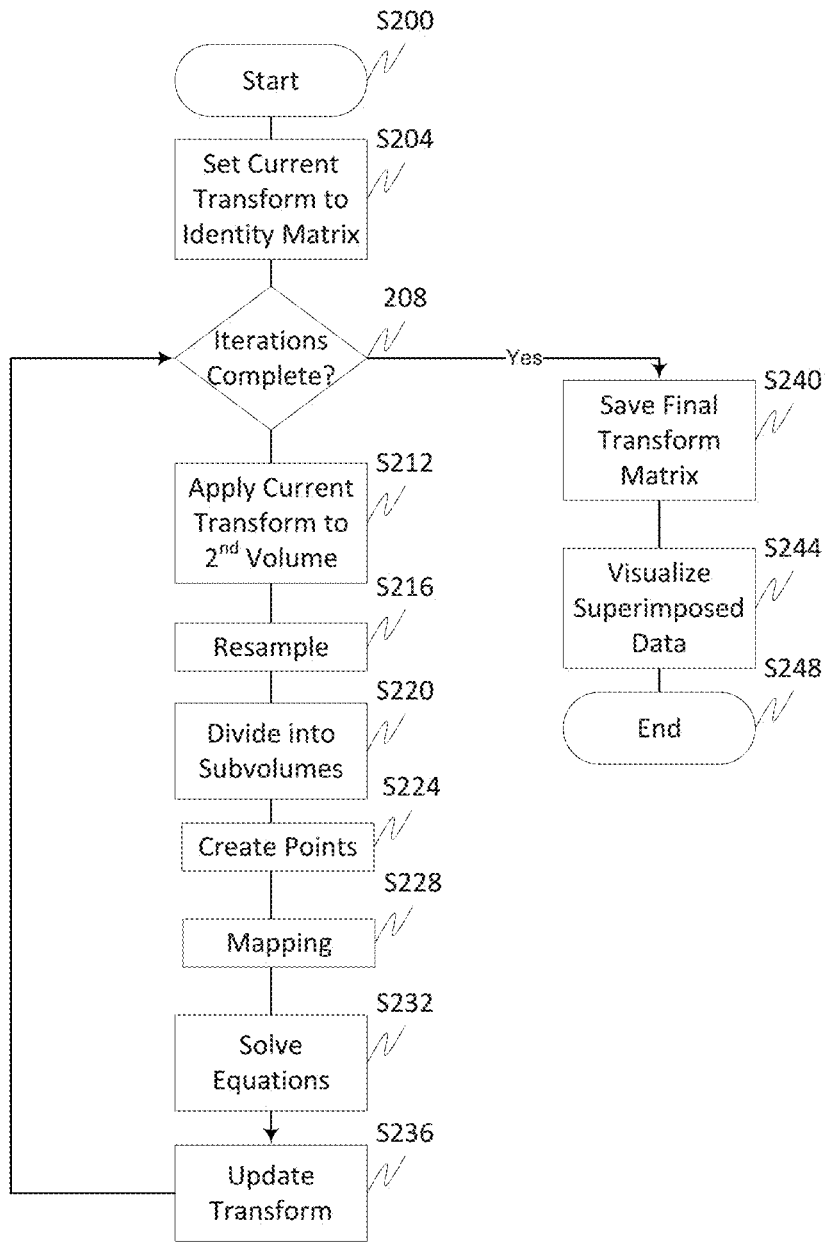
FIG. 2 is a graphical representation or flow chart of the major processes in an exemplary algorithm of the invention.

FIG. 2 shows the exemplary steps and the work flow for an exemplary implementation of this technique. Control begins in step S200. Next, in step S204, the current transform is set to identity matrix. Then, in step S208 a determination is made whether all iterations done. If all iterations are complete, control jumps to step S240 with control otherwise continuing to step S212.

In step S212, the current transform is applied to the second volume. Optionally, in step S216 the data can be resampled for speed with the use of the difference of Gaussian filtering usable to prevent aliasing. Next, in step S220, the data is divided into a number of small subvolumes, with cross-correlations being performed on corresponding subvolumes. Then, in step S224, a set of corresponding points is created using the first subvolume centers and the second subvolume centers plus the correlation shifts. Control then continues to step S228.

In step S228, a system of linear equations is established which maps the points of the second volume to the points of the first volume. As Solution of Systems of linear equations are common knowledge, these will not be explained in detail and any know solution can be used herein. Next, in step S232, the system of linear equations is solved using standard least-squares techniques and a new 3×4 matrix transform is created. Then, in step S236, the current transform is replaced with a new transform. Control then continues to step S240.

In step S240, a new iteration is started with control jumping back to step S208. If all iterations are complete, control continues to step S240 where a final transform matrix is saved. This transform matrix can be implemented as a basic transform from one coordinate to another: A=M B, where A is the old coordinate, B is the new and M is the transform matrix. Next, in step S244, the superimposed data can be visualized. Control then continues to step S248 where the control sequence ends.

Figure 3:
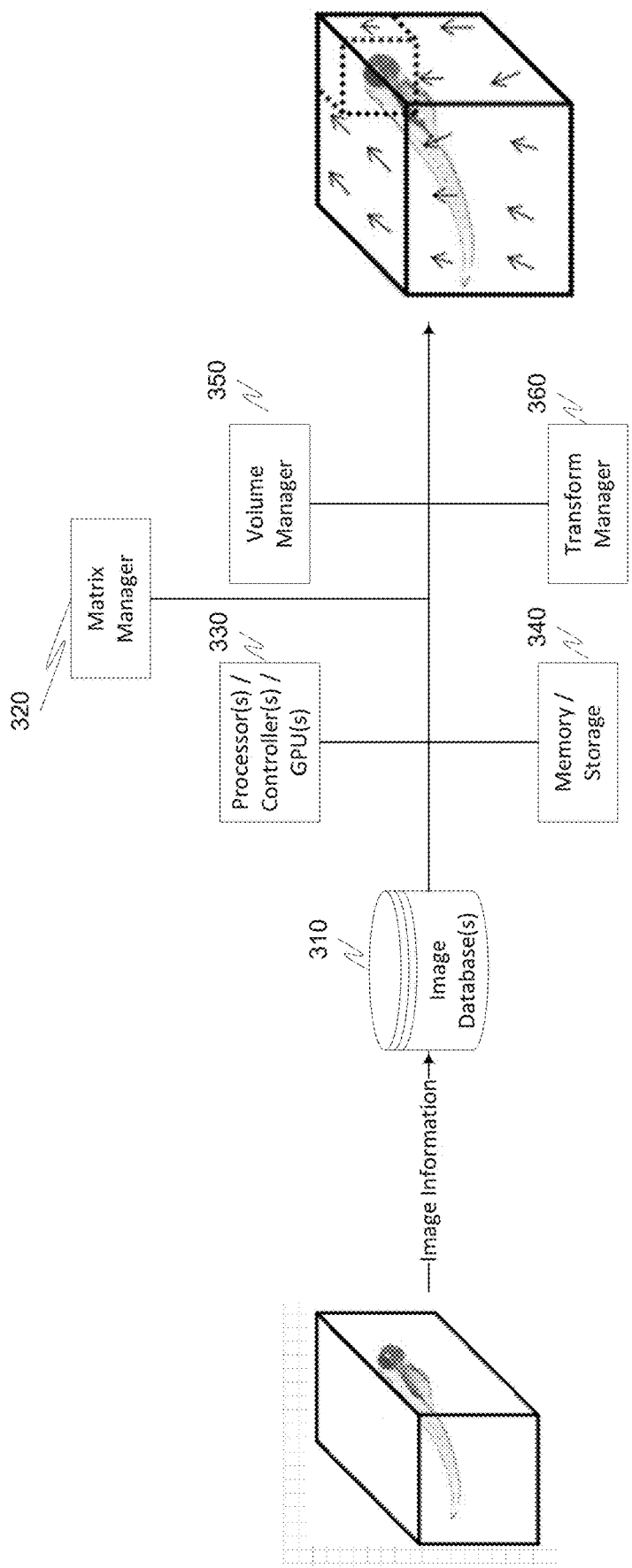
FIG. 3 is a block diagram illustrating an image processing system according to the techniques disclosed herein.

FIG. 3 illustrates an exemplary system to implement the above process. The system comprises an image database 310, matrix manager 320, processor 330, memory 340, volume manager 350 and transform manager 360, all interconnected via one or more wired or wireless links.

Image data is received in the image database 310 from one or more of a network, the cloud, the Internet, a microscope, or in general from any source. The transform manager cooperating the processor and memory then set the current transform to identity matrix. Once all iterations are complete, the current transform is applied to the second volume in cooperation with the volume manager 350, processor 330 and memory 340. Optionally, the data can be resampled by the processor 330 for speed with the use of the difference of Gaussian filtering usable to prevent aliasing. Next, the data is divided into a number of small subvolumes using the volume manager 350, processor and memory 340, with cross-correlations being performed on corresponding subvolumes. The processor and memory, using computer-executable instructions, create a set of corresponding points using the first subvolume centers and the second subvolume centers plus the correlation shifts. A system of linear equations is established which maps, by the processor and memory, the points of the second volume to the points of the first volume, with the system of linear equations solved using a standard least-squares techniques and a new 3×4 matrix transform is created by the matrix manager 320, processor 33 and memory 340. Then, the transform manager with the processor and memory replace the current transform with a new transform.

The processor 330 and memory 340 then start a new iteration. If all iterations are complete, a final transform matrix is saved with the cooperation of the transform manager 360. The superimposed data then be saved in the image database 310 and can also be visualized, for example on a display (not shown).

The processes have been described above as a series of steps. However, one or more of the steps can be optional and may be skipped. Additionally, the steps can be performed in a different order than described above.

Benefits, other advantages, and solutions to problems have been described herein regarding specific embodiments. However, the benefits, advantages, solutions to problems, and any elements that may cause any benefit, advantage, or solution to occur or become more pronounced are not to be construed as critical, required, or essential features or elements of the disclosure.

No claim element herein is to be construed under the provisions of 35 U.S.C. 112, sixth paragraph, unless the element is expressly recited using the phrase "means for."

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (Wireless Gigabit Alliance, Inc. WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec., 2012); IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); IEEE802.11-ay (P802.11ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz)), IEEE 802.11-2016 and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.5, August 2014) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, or operate using any one or more of the above protocols, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, a drone, a communications enabled drone or UAV, or the like.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

Some demonstrative embodiments may be used in conjunction with a WLAN (Wireless Local Area Network), e.g., a Wi-Fi network. Other embodiments may be used in conjunction with any other suitable wireless communication network, for example, a wireless area network, a "piconet", a WPAN, a WVAN, and the like.

Some demonstrative embodiments may be used in conjunction with a wireless communication network communicating over a frequency band of 5 GHz and/or 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 GhH and 300 GHz, a WLAN frequency band, a WPAN frequency band, a frequency band according to the WGA specification, and the like.

While the above provides just some simple examples of the various device configurations, it is to be appreciated that numerous variations and permutations are possible.

In the detailed description, numerous specific details are set forth in order to provide a thorough understanding of the disclosed techniques. However, it will be understood by those skilled in the art that the present techniques may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like. For example, "a plurality of stations" may include two or more stations.

It may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, circuitry, firmware or software, or some combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, or within a dedicated secured, unsecured, and/or encrypted system and/or within a network operation or management device that is located inside or outside the network.

Thus, it should be appreciated that the components of the system can be combined into one or more devices, or split between devices. As will be appreciated from the following description, and for reasons of computational efficiency, the components of the system can be arranged at any location within the environment without affecting the operation thereof.

Furthermore, it should be appreciated that the various links, including the communications channel(s) connecting the elements, can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Aspects are directed toward:

A method to align two image datasets comprising:

for each dataset, divide the dataset into sub-datasets;

align one sub-dataset from a first dataset with a corresponding sub-dataset from a second dataset;

use transformation data from the sub-dataset alignment to generate input to a general alignment for the two datasets;

align the two datasets using the transformation data; and output an aligned dataset of the two image datasets.

Any of the above aspects, where the datasets include multi-dimensional spatial information of a real-world object.

Any of the above aspects, where the datasets include different views of the real-world object.

Any of the above aspects, where the different views include orthogonal views.

Any of the above aspects, where real-world resolution or spacing is different in different dimensions for the different datasets.

Any of the above aspects, where the sub-datasets are larger in real world space than the expected alignment error between the datasets.

Any of the above aspects, where the aligning of the sub-datasets uses cross-correlation optimization.

Any of the above aspects, where a 3×4 matrix is generated to represent the alignment between the datasets.

Any of the above aspects, where the matrix is generated by a least-squares fit between offsets of the sub-dataset alignments.

A system that aligns two image datasets comprising:

an image database;

at least one processor; and a memory, the memory storing instructions that when executed by the at least one processor perform:

for each dataset, dividing of the dataset into sub-datasets;

aligning one sub-dataset from a first dataset with a corresponding sub-dataset from a second dataset;

using transformation data from the sub-dataset alignment to generate input to a general alignment for the two datasets;

aligning the two datasets using the transformation data; and outputting an aligned dataset of the two image datasets.

Any of the above aspects, further comprising one or more of a volume manager, a matrix manager and a transform manager.

Any of the above aspects 0, where the datasets include multi-dimensional spatial information of a real-world object.

Any of the above aspects 2, where the datasets include different views of the real-world object.

Any of the above aspects, where the different views include orthogonal views.

Any of the above aspects, where real-world resolution or spacing is different in different dimensions for the different datasets.

Any of the above aspects, where the sub-datasets are larger in real world space than the expected alignment error between the datasets.

Any of the above aspects, where the aligning of the sub-datasets uses cross-correlation optimization.

Any of the above aspects, where a 3×4 matrix is generated to represent the alignment between the datasets.

Any of the above aspects, where the matrix is generated by a least-squares fit between offsets of the sub-dataset alignments.

The systems and methods disclosed herein can also be implemented as instructions on a computer-readable information storage media that when executed by one or more processors cause to be performed any of the above aspects disclosed herein.

A system on a chip (SoC) including any one or more of the above aspects disclosed herein.

One or more means for performing any one or more of the above aspects disclosed herein.

Any one or more of the aspects as substantially described herein.

For purposes of explanation, numerous details are set forth in order to provide a thorough understanding of the present embodiments. It should be appreciated however that the techniques herein may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, or collocated on a particular node/element(s) of a distributed network, such as a data processing or image processing network. As will be appreciated from the following description, and for reasons of computational efficiency, the components of the system can be arranged at any location within a distributed network without affecting the operation of the system.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments. Additionally, the exemplary techniques illustrated herein are not limited to the specifically illustrated embodiments but can also be utilized with the other exemplary embodiments and each described feature is individually and separately claimable.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, an image processing or big data processing device, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIVI926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a server.

It is therefore apparent that there has at least been provided systems and methods for improved image data processing. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

The invention claimed is:

1. A method to align two image datasets comprising:
for each dataset, divide the dataset into sub-datasets;
align one sub-dataset from a first dataset with a corresponding sub-dataset from a second dataset;
use transformation data from the sub-dataset alignment to generate input to a general alignment for the two datasets;
align the two datasets using the transformation data, where a 3×4 matrix is generated to represent the alignment between the datasets; and
output an aligned dataset of the two image datasets.

2. The method of claim 1, where the datasets include multi-dimensional spatial information of a real-world object.

3. The method of claim 2, where the datasets include different views of the real-world object.

4. The method of claim 3, where the different views include orthogonal views.

5. The method of claim 3, where real-world resolution or spacing is different in different dimensions for the different datasets.

6. The method of claim 1, where the sub-datasets are larger in real world space than the expected alignment error between the datasets.

7. The method of claim 1, where the aligning of the sub-datasets uses cross-correlation optimization.

8. The method of claim 1, where the matrix is generated by a least-squares fit between offsets of the sub-dataset alignments.

9. A system that aligns two image datasets comprising:
an image database;
at least one processor; and
a memory, the memory storing instructions that when executed by the at least one processor perform:
for each dataset, dividing of the dataset into sub-datasets;
aligning one sub-dataset from a first dataset with a corresponding sub-dataset from a second dataset;
using transformation data from the sub-dataset alignment to generate input to a general alignment for the two datasets;
aligning the two datasets using the transformation data, where a 3×4 matrix is generated to represent the alignment between the datasets; and
outputting an aligned dataset of the two image datasets.

10. The system of claim 9, further comprising one or more of a volume manager, a matrix manager and a transform manager.

11. The system of claim 9, where the datasets include multi-dimensional spatial information of a real-world object.

12. The system of claim 11, where the datasets include different views of the real-world object.

13. The system of claim 12, where the different views include orthogonal views.

14. The system d of claim 12, where real-world resolution or spacing is different in different dimensions for the different datasets.

15. The system of claim 9, where the sub-datasets are larger m real world space than the expected alignment error between the datasets.

16. The system of claim 9, where the aligning of the sub-datasets uses cross-correlation optimization.

17. The system of claim 9, where the matrix is generated by a least-squares fit between offsets of the sub-dataset alignments.

* * * * *